(12) United States Patent
Kachita et al.

(10) Patent No.: US 9,742,500 B2
(45) Date of Patent: Aug. 22, 2017

(54) OPTICAL TRANSMISSION APPARATUS AND OPTICAL SIGNAL PROCESSING METHOD

(71) Applicant: FUJITSU LIMITED, Kawasaki-shi, Kanagawa (JP)

(72) Inventors: Yoshito Kachita, Kawasaki (JP); Norifumi Shukunami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/082,039

(22) Filed: Mar. 28, 2016

(65) Prior Publication Data
US 2016/0315709 A1 Oct. 27, 2016

(30) Foreign Application Priority Data
Apr. 24, 2015 (JP) .................................. 2015-089476

(51) Int. Cl.
*H04B 10/04* (2006.01)
*H04B 10/564* (2013.01)
*H04B 10/294* (2013.01)
*H04B 10/50* (2013.01)

(52) U.S. Cl.
CPC ......... *H04B 10/564* (2013.01); *H04B 10/294* (2013.01); *H04B 10/506* (2013.01)

(58) Field of Classification Search
CPC ...... H04B 10/50; H04B 10/564; H04J 14/021
See application file for complete search history.

(56) References Cited

U.S. PATENT DOCUMENTS

| | | | |
|---|---|---|---|
| 9,008,510 B1* | 4/2015 | Zhao | H04Q 11/0005 370/244 |
| 2007/0053650 A1* | 3/2007 | Shimada | H04J 14/0221 385/140 |
| 2010/0129082 A1* | 5/2010 | Zhong | H04J 14/0204 398/83 |
| 2010/0150563 A1* | 6/2010 | Nakajima | H04B 10/07955 398/81 |
| 2012/0002964 A1* | 1/2012 | Takatsu | H04J 14/0204 398/50 |
| 2012/0063766 A1* | 3/2012 | Matsukawa | H04B 10/0793 398/20 |

(Continued)

FOREIGN PATENT DOCUMENTS

JP 2012-257002 12/2012

*Primary Examiner* — Ken N Vanderpuye
*Assistant Examiner* — Amritbir Sandhu
(74) *Attorney, Agent, or Firm* — Staas & Halsey LLP

(57) ABSTRACT

An optical transmission apparatus includes an amplifier array device; and a switch device coupled to the amplifier array device via an optical cable, wherein the amplifier array device includes a plurality of amplifiers configured to amplify a plurality of optical signals at mutually different wavelengths and to output the plurality of amplified optical signals, a plurality of beam separators configured to generate a plurality of separated light beams by separating the plurality of amplified optical signals and to output the plurality of separated light beams, a beam combiner configured to generate combined light by combining the plurality of separated light beams and to output the combined light to the switch device through the optical cable, and a photo-detector configured to detect a power of the combined light returned from the switch device through the optical cable.

6 Claims, 4 Drawing Sheets

(56) References Cited

U.S. PATENT DOCUMENTS

| | | | |
|---|---|---|---|
| 2012/0128347 A1* | 5/2012 | Sakamoto | H04J 14/0204 398/9 |
| 2012/0248287 A1* | 10/2012 | Shukunami | H04B 10/032 250/205 |
| 2012/0315033 A1* | 12/2012 | Sugiya | H04B 10/07 398/34 |
| 2014/0147121 A1* | 5/2014 | Matsukawa | H04J 14/0204 398/83 |
| 2015/0093073 A1* | 4/2015 | Wright | G02B 6/2804 385/24 |
| 2015/0208146 A1* | 7/2015 | Younce | H04Q 11/0066 398/21 |
| 2016/0099851 A1* | 4/2016 | Archambault | H04J 14/0212 398/16 |
| 2016/0315701 A1* | 10/2016 | Yuki | H04J 14/0221 |

* cited by examiner

OPTICAL TRANSMISSION APPARATUS AND OPTICAL SIGNAL PROCESSING METHOD

CROSS-REFERENCE TO RELATED APPLICATION

This application is based upon and claims the benefit of priority of the prior Japanese Patent Application No. 2015-089476, filed on Apr. 24, 2015, the entire contents of which are incorporated herein by reference.

FIELD

The embodiments discussed herein are related to an optical transmission apparatus and an optical signal processing method.

BACKGROUND

Optical networks using wavelength-division multiplexing (WDM) are being widely used with the increasing demand for telecommunication (for example, see Japanese Laid-open Patent Publication No. 2012-257002). WDM is a technique of multiplexing and transmitting a plurality of optical signals at different wavelengths. WDM, for example, enables multiplexing and transmitting of 40-channel optical signals, each at a transmission rate of 40 Gbps, as a wavelength-division multiplex optical signal (hereinafter referred to as a multiplex optical signal) at 1.6 Tbps.

WDM is used for an optical transmission apparatus such as a reconfigurable optical add-drop multiplexer (ROADM) apparatus. The ROADM apparatus includes a plurality of optical transceivers that are also called transponders, for example. The plurality of optical transceivers transmit and receive optical signals at mutually different wavelengths to and from external networks.

The ROADM apparatus multiplexes optical signals at different wavelengths input from the plurality of optical transceivers and transmits the resulting multiplex optical signal to a node in a certain path. The ROADM apparatus receives each multiplex optical signal from a node in a corresponding path, demultiplexes the multiplex optical signal into optical signals at arbitrary wavelengths, and outputs the optical signals to the plurality of optical transceivers. Wavelength selective switches (WSSs), for example, multiplex the optical signals and demultiplex the multiplex optical signals. Accordingly, the ROADM apparatus adds and drops optical signals at arbitrary wavelengths.

Such an ROADM apparatus may have a colorless, directionless, and contentionless (CDC) function. The CDC function refers to a function of transmitting added and dropped optical signals to optical transceivers without signal collision regardless of the wavelength and path.

In a case of dropping optical signals at an ROADM apparatus having a CDC function, in order to compensate for losses at an add/drop unit, a plurality of amplifiers provided in an amplifier array device amplify the respective multiplex optical signals input from the respective paths. The amplified multiplex optical signals are then input to a multicast switch (MCS) unit. In the MCS device, each optical switch selects a multiplex optical signal from a certain path for a corresponding optical transceiver, and the optical transceiver receives the multiplex optical signal. The optical transceiver may receive an optical signal at an arbitrary wavelength obtained as a result of, for example, demultiplexing of the multiplex optical signal by a WSS.

The amplifier array device and the MCS device are coupled to each other via, for example, multi-fiber push-on (MPO) connectors and an MPO cable. The MPO cable is an optical cable including a plurality of cores for transmitting a plurality of light beams, and the MPO connector is an optical connector used to connect the MPO cable.

If the MPO cable is disconnected between the amplifier array device and the MCS device, intense light that has been amplified by the amplifiers might leak outside the apparatus. Accordingly, connection of the MPO cable is checked to ensure that it is safe for the human body.

It is possible to check the connection of the MPO cable between the amplifier array device and the MCS device if, for example, there are provided light receivers that are the same as the amplifiers in number and that detect the power of the optical signals output from the respective amplifiers in the amplifier array device through the MPO cable. However, a plurality of light receivers have to be provided in this case, and accordingly, the apparatus becomes a large-scale apparatus, and the cost and mounting area are increased. Therefore, it is desirable that the connection of the optical cable is checked with a small-scale configuration.

SUMMARY

According to an aspect of the invention, an optical transmission apparatus includes an amplifier array device; and a switch device coupled to the amplifier array device via an optical cable, wherein the amplifier array device includes a plurality of amplifiers configured to amplify a plurality of optical signals at mutually different wavelengths and to output the plurality of amplified optical signals, a plurality of beam separators configured to generate a plurality of separated light beams by separating the plurality of amplified optical signals and to output the plurality of separated light beams, a beam combiner configured to generate combined light by combining the plurality of separated light beams and to output the combined light to the switch device through the optical cable, and a photo-detector configured to detect a power of the combined light returned from the switch device through the optical cable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
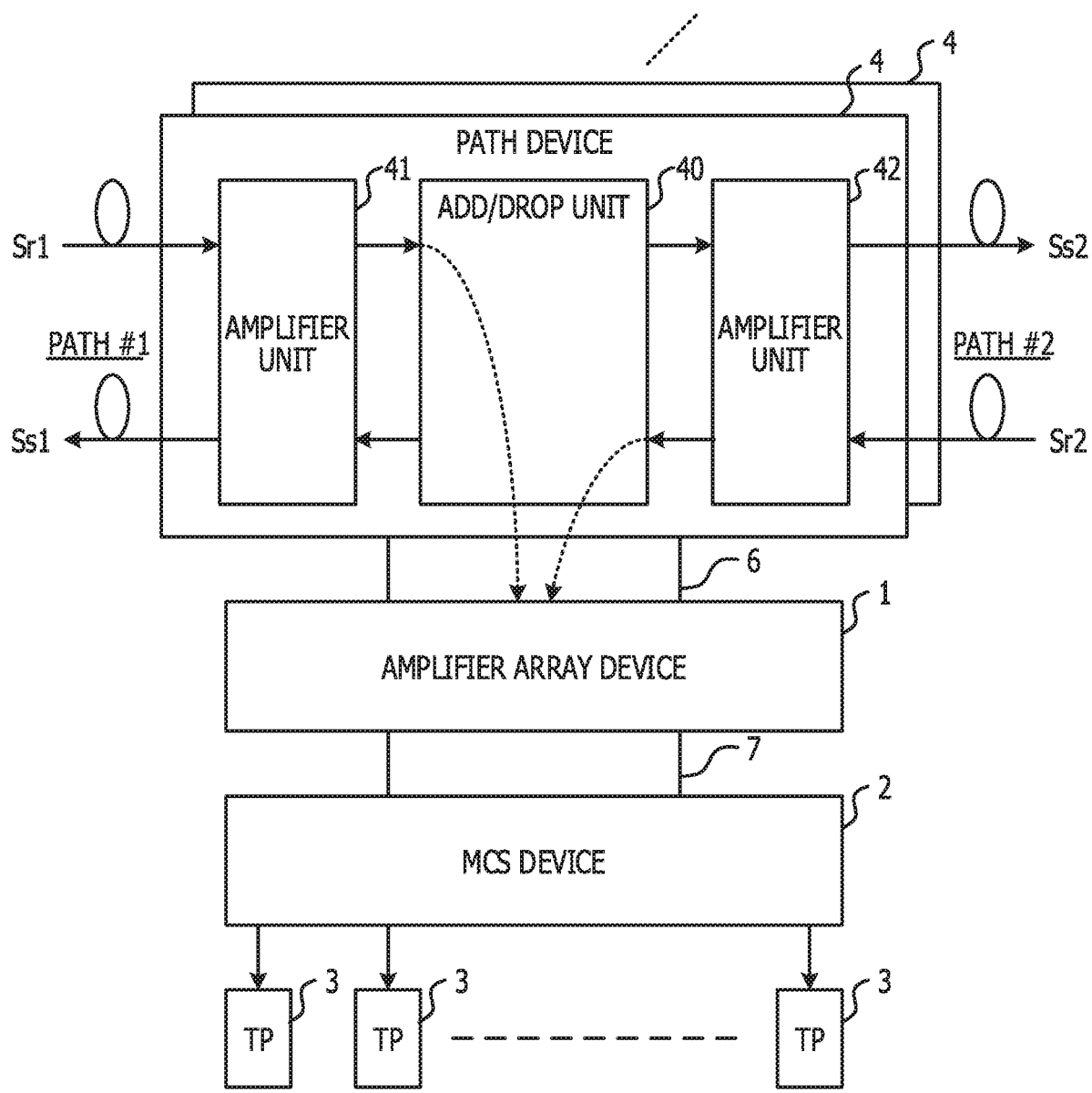
FIG. 1 illustrates an exemplary configuration of an optical transmission apparatus.

FIG. 1 illustrates an exemplary configuration of an optical transmission apparatus. Although this embodiment illustrates an ROADM apparatus having a CDC function as an example of the optical transmission apparatus, the optical transmission apparatus according to this embodiment is not limited to this ROADM apparatus.

The optical transmission apparatus includes an amplifier array device 1, an MCS device 2, a plurality of transponders (TPs) 3, and a plurality of path units 4. A path device 4 is provided for each set of paths among paths #1 to #N (N is a positive integer), and each of the path units 4 includes an add/drop unit 40 and amplifier units 41 and 42. The path device 4 for the paths #1 and #2 is described below as an example, and the other path units 4 have similar configurations.

Examples of each of the amplifier units 41 and 42 include an erbium-doped fiber amplifier (EDFA) including erbium-doped fibers (EDFs), a semiconductor optical amplifier (SOA), and a Raman amplifier. The amplifier unit 41 amplifies a multiplex optical signal Sr1 input from an optical transmission path in the path #1 and outputs the amplified multiplex optical signal Sr1 to the add/drop unit 40. The amplifier unit 41 also amplifies a multiplex optical signal Ss1 output from the add/drop unit 40 and outputs the amplified multiplex optical signal Ss1 to an optical transmission path in the path #1. The amplifier unit 42 amplifies a multiplex optical signal Sr2 input from an optical transmission path in the path #2 and outputs the amplified multiplex optical signal Sr2 to the add/drop unit 40. The amplifier unit 42 also amplifies a multiplex optical signal Ss2 output from the add/drop unit 40 and outputs the amplified multiplex optical signal Ss2 to an optical transmission path in the path #2.

The add/drop unit 40 includes, for example, a plurality of wavelength selective switches (WSSs). In accordance with settings of the WSSs, the add/drop unit 40 selects light at an arbitrary wavelength from the multiplex optical signal Sr1 input from the path #1 and makes the light travel through any path other than the path #1 among the paths #1 to #N; and the add/drop unit 40 selects light at an arbitrary wavelength from the multiplex optical signal Sr2 input from the path #2 and makes the light travel through any path other than the path #2 among the paths #1 to #N. Further, the add/drop unit 40 adds optical signals at arbitrary wavelengths (not illustrated) to the multiplex optical signals Ss1 and Ss2 to be output to the paths #1 and #2.

The add/drop unit 40 drops optical signals at arbitrary wavelengths from the multiplex optical signals Sr1 and Sr2 input from the paths #1 and #2. Accordingly, the add/drop unit 40 outputs the multiplex optical signals Sr1 and Sr2, from which optical signals have been dropped, to the amplifier array device 1 through an MPO cable 6. Multiplex optical signals Sr3 to Srn input from the paths #3 to #N are input to the amplifier array device 1 through the path units 4 and the MPO cable 6.

The multiplex optical signals Sr1 to Srn from all the paths #1 to #N are input through the path units 4 to the MPO cable 6. The MPO cable 6 includes a bundle of a plurality of cores (for example, optical fibers) through which light travels. Accordingly, the MPO cable 6 enables all the multiplex optical signals Sr1 to Srn from the paths #1 to #N to be output to the amplifier array device 1 through a single cable.

The amplifier array device 1, which is an example of a first unit, amplifies the individual multiplex optical signals Sr1 to Srn from the paths #1 to #N. The amplifier array device 1 and the MCS device 2 are coupled to each other via an MPO cable 7.

The amplifier array device 1 outputs the amplified multiplex optical signals Sr1 to Srn to the MCS device 2 through the MPO cable 7. Accordingly, the amplified multiplex optical signals Sr1 to Srn are output to the MCS device 2 through the common MPO cable 7. Each of the MPO cables 6 and 7 is an example of an optical cable.

The MCS device 2, which is an example of a second unit, includes optical switches including N input ports (N is equal to the number of paths) and M output ports (M is equal to the number of transponders 3). The MCS device 2 outputs each of the multiplex optical signals Sr1 to Srn from the paths #1 to #N to a corresponding one of the transponders 3.

Figure 2:
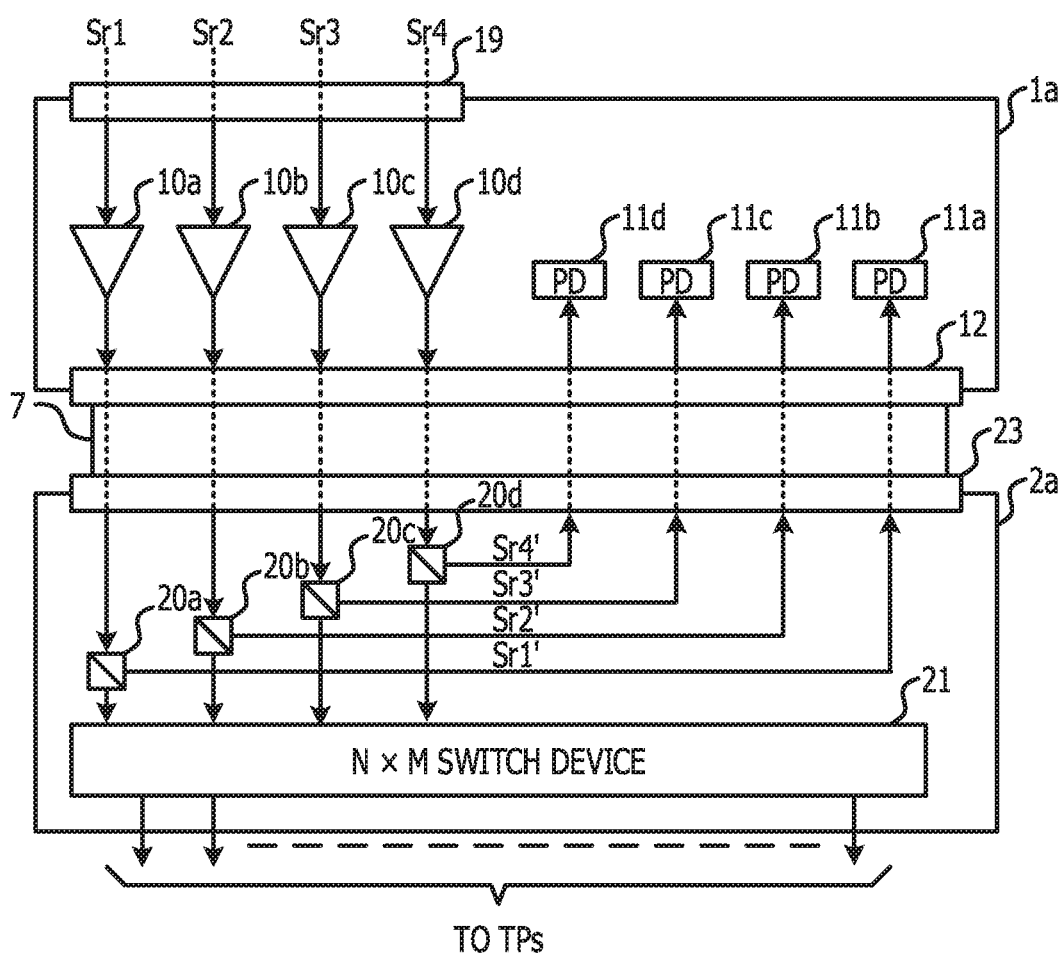
FIG. 2 illustrates configurations of an amplifier array device and an MCS device according to a comparative example.

FIG. 2 illustrates configurations of an amplifier array device 1a and an MCS device 2a according to a comparative example. The amplifier array device 1a includes a plurality of amplifiers 10a to 10d, a plurality of photo-detectors (PDs) 11a to 11d, and MPO connectors 12 and 19. The MCS device 2a includes beam separators 20a to 20d, an N×M switch device 21, and an MPO connector 23.

In this comparative example, N, which is the number of paths, is assumed to be 4, for example. Accordingly, the plurality of amplifiers 10a, 10b, 10c, and 10d receive multiplex optical signals Sr1, Sr2, Sr3, and Sr4 from paths #1, #2, #3, and #4, respectively, through the path units 4 and the MPO connector 19. The MPO connector 19 is coupled to the MPO cable 6 and includes as many ports as the cores in the MPO cable 6.

The plurality of amplifiers 10a to 10d, each of which is an EDFA, for example, are arranged side by side in order to reduce scale and cost. The plurality of amplifiers 10a, 10b, 10c, and 10d, which are examples of output units, amplify and output the multiplex optical signals Sr1, Sr2, Sr3, and Sr4, respectively, to the MPO connector 12. The MPO connector 12 is coupled to the MPO cable 7 and includes as many ports as the cores in the MPO cable 7.

Accordingly, each of the amplified multiplex optical signals Sr1 to Sr4 is output to the MCS device 2a through the MPO cable 7. That is, the plurality of amplifiers 10a, 10b, 10c, and 10d output the multiplex optical signals Sr1, Sr2, Sr3, and Sr4, respectively, to the MCS device 2a through the MPO cable 7.

The multiplex optical signals Sr1, Sr2, Sr3, and Sr4 input to the MCS device 2a are input to the beam separators 20a, 20b, 20c, and 20d, respectively, through the MPO connector 23. The beam separators 20a, 20b, 20c, and 20d, each of which is an optical splitter, for example, separate the multiplex optical signals Sr1, Sr2, Sr3, and Sr4, respectively.

The multiplex optical signals Sr1 to Sr4 that have traveled through the beam separators 20a to 20d are input to the N×M switch device 21. The N×M switch device 21, which includes a plurality of optical splitters, optical switches, and the like, selects each of the multiplex optical signals Sr1, Sr2, Sr3, and Sr4 from the paths #1 to #4 for a corresponding one of the output ports coupled to the transponders 3, and outputs the assigned multiplex optical signals to the transponders 3.

Meanwhile, the beam separators 20a, 20b, 20c, and 20d separate the multiplex optical signals Sr1, Sr2, Sr3, and Sr4 to generate separated light beams Sr1', Sr2', Sr3', and Sr4', respectively, and the separated light beams Sr'1 to Sr'4 are output to the amplifier array device 1a through the MPO connector 23 and the MPO cable 7. The separated light beams Sr1', Sr2', Sr3', and Sr4' are input to the PDs 11a, 11b, 11c, and 11d, respectively, through the MPO connector 12.

The PDs 11a, 11b, 11c, and 11d detect the power of the separated light beams Sr1', Sr2', Sr3', and Sr4', respectively. Thus, it is possible to detect the power of each of the multiplex optical signals Sr1 to Sr4 output to the MCS device 2a, thereby enabling checking of whether the MPO cable 7 is normally connected between the amplifier array device 1a and the MCS device 2a. If the connection of the MPO cable 7 is defective, the power of the multiplex optical signals Sr1 to Sr4 is decreased after the multiplex optical signals Sr1 to Sr4 have traveled through the MPO cable 7. Accordingly, defective connection is detected based on the power detected by the PDs 11a to 11d.

However, the PDs 11a to 11d that are the same as the amplifiers 10a to 10d in number have to be provided in this case. Accordingly, the apparatus becomes a large-scale apparatus, and the cost and mounting area are increased.

Therefore, in the following embodiments, the multiplex optical signals Sr1 to Sr4 output from the plurality of amplifiers 10a to 10d to the MCS device 2 through the MPO cable 7 are separated, and the separated light beams Sr1' to Sr4' are combined and travel through the MPO cable 7. By detecting the power of the combined light, the connection of the MPO cable 7 is checked.

First Embodiment

Figure 3:
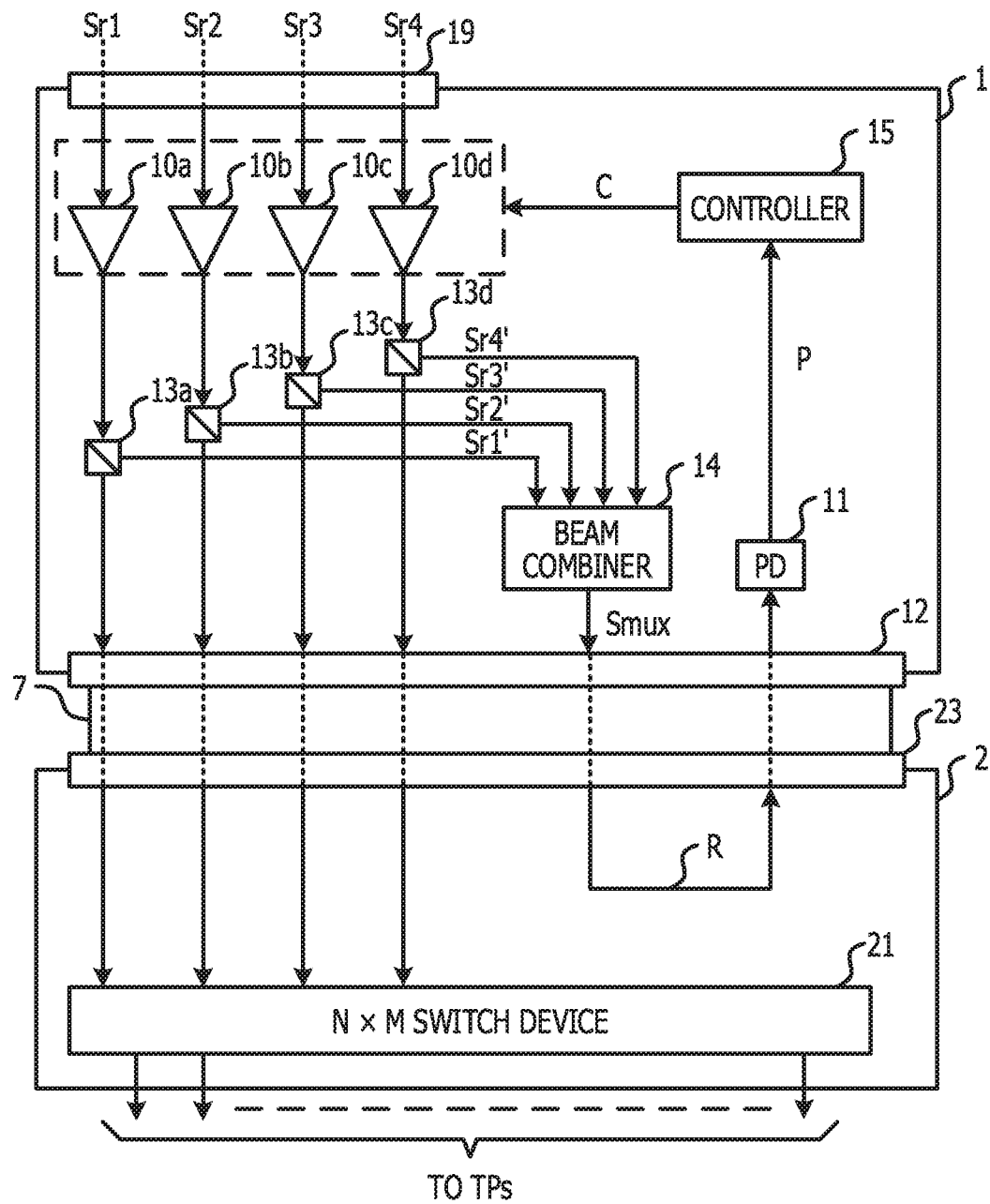
FIG. 3 illustrates configurations of an amplifier array device and an MCS device according to a first embodiment.

FIG. 3 illustrates configurations of the amplifier array device 1 and the MCS device 2 according to a first embodiment. Some components in FIG. 3 that are the same or substantially the same as those in FIG. 2 are denoted by the same reference numerals and description thereof is omitted.

The amplifier array device 1 includes the plurality of amplifiers 10a to 10d, a PD 11, the MPO connectors 12 and 19, a plurality of beam separators 13a to 13d, a beam combiner 14, and a controller 15. The MCS device 2 includes the N×M switch device 21, the MPO connector 23, and a return waveguide R. In this embodiment, N, which is the number of paths, is also assumed to be 4, for example.

The plurality of amplifiers 10a, 10b, 10c, and 10d output the multiplex optical signals Sr1, Sr2, Sr3, and Sr4, respectively, to the MCS device 2 through the MPO cable 7. The multiplex optical signals Sr1 to Sr4 output to the MCS device 2 are input to the N×M switch device 21.

The beam separators 13a, 13b, 13c, and 13d, each of which is an optical splitter, for example, separate the multiplex optical signals Sr1, Sr2, Sr3, and Sr4 output from the amplifiers 10a, 10b, 10c, and 10d, respectively. The beam combiner 14, which is an optical coupler, for example, combines separated light beams Sr1' to Sr4' generated by the beam separators 13a to 13d and outputs the resulting combined light Smux to the MCS device 2 through the MPO cable 7. The combined light Smux input to the MCS device 2 is returned to the amplifier array device 1 through the MPO cable 7 by the return waveguide R.

The PD 11, which is an example of a detecting unit, detects the power of the combined light Smux returned from the MCS device 2 through the MPO cable 7. If the connection of the MPO cable 7 is defective, the power of the combined light Smux is decreased after the combined light Smux has traveled through the MPO cable 7. Accordingly, defective connection is detected based on the power detected by the PD 11. The unit for detecting the power of the combined light Smux is not limited to the PD 11, and a different light receiver may be used.

Light beams separated from the multiplex optical signals Sr1 to Sr4 from the paths #1 to #4 are combined as the combined light Smux. Accordingly, if any one of the multiplex optical signals Sr1 to Sr4 is input from a corresponding one of the paths #1 to #4, the connection of the MPO cable 7 can be checked. If none of the multiplex optical signals Sr1 to Sr4 are input from the paths #1 to #4, defective connection is detected, but the operation of the optical transmission apparatus is not affected because none of the multiplex optical signals Sr1 to Sr4 are input.

Since the optical transmission apparatus has a CDC function, the multiplex optical signals Sr1 to Sr4 may include the same wavelength. However, the combined light Smux is not main signal light and is used as an optical signal for checking the connection of the MPO cable 7. Accordingly, the operation of the optical transmission apparatus does not cause a problem.

The PD 11 detects the power of the combined light Smux generated from the multiplex optical signals Sr1 to Sr4 in the above manner, and thus, it is sufficient to provide the single PD 11. Accordingly, the apparatus for checking the connection of the MPO cable 7 becomes a small-scale apparatus and has a lower cost and a smaller mounting area.

The PD 11 also outputs the detected power P of the combined light Smux to the controller 15 as an electrical signal. If the power P of the combined light Smux detected by the PD 11 falls below a predetermined value, the controller 15 causes the power of the multiplex optical signals Sr1 to Sr4 output from the amplifiers 10a to 10d to be decreased. The controller 15 is formed of a logic circuit, for example.

More specifically, if the power P of the combined light Smux falls below the predetermined value, the controller 15 determines that the connection of the MPO cable 7 is defective and outputs, to each of the amplifiers 10a to 10d, a control signal C for decreasing outputs of the amplifiers 10a to 10d. Upon receiving the control signal C, the amplifiers 10a to 10d decrease the power of the multiplex optical signals Sr1 to Sr4 by adjusting gains for amplification, for example. The amplifiers 10a to 10d may stop outputting the multiplex optical signals Sr1 to Sr4 (that is, the amplifiers 10a to 10d may set the power of the multiplex optical signals Sr1 to Sr4 to 0).

Accordingly, even if the MPO cable 7 is disconnected from any of the MPO connectors 12 and 23 and any of the multiplex optical signals Sr1 to Sr4 leaks outside the apparatus, the influence of light on the human body is reduced because the power of the multiplex optical signals Sr1 to Sr4 is decreased.

As described above, the optical transmission apparatus according to this embodiment includes the amplifier array device 1 and the MCS device 2 that are coupled to each other via the MPO cable 7. The amplifier array device 1 includes the plurality of amplifiers 10a to 10d, the plurality of beam separators 13a to 13d, the beam combiner 14, and the PD 11.

The plurality of amplifiers 10a, 10b, 10c, and 10d output the multiplex optical signals Sr1, Sr2, Sr3, and Sr4, respectively, to the MCS device 2 through the MPO cable 7. The beam separators 13a, 13b, 13c, and 13d separate the multiplex optical signals Sr1, Sr2, Sr3, and Sr4, respectively. The beam combiner 14 combines the separated light beams Sr'1 to Sr'4 generated by the beam separators 13a to 13d and outputs the resulting combined light Smux to the MCS device 2 through the MPO cable 7. The PD 11 detects the power of the combined light Smux returned from the MCS device 2 through the MPO cable 7.

With the above configuration, the PD 11 detects the power of the combined light Smux generated from the multiplex optical signals Sr1 to Sr4, and thus, it is sufficient to provide the single PD 11. Accordingly, the apparatus for checking the connection of the MPO cable 7 becomes a small-scale apparatus and has a lower cost and a smaller mounting area.

Therefore, the optical transmission apparatus according to this embodiment enables checking of the connection of the optical cable with a small-scale configuration.

Second Embodiment

According to the first embodiment, the multiplex optical signals Sr1 to Sr4 are separated and the combined light Smux is generated in the amplifier array device 1. However, the multiplex optical signals Sr1 to Sr4 may be separated and the combined light Smux may be generated in the MCS device 2.

Figure 4:
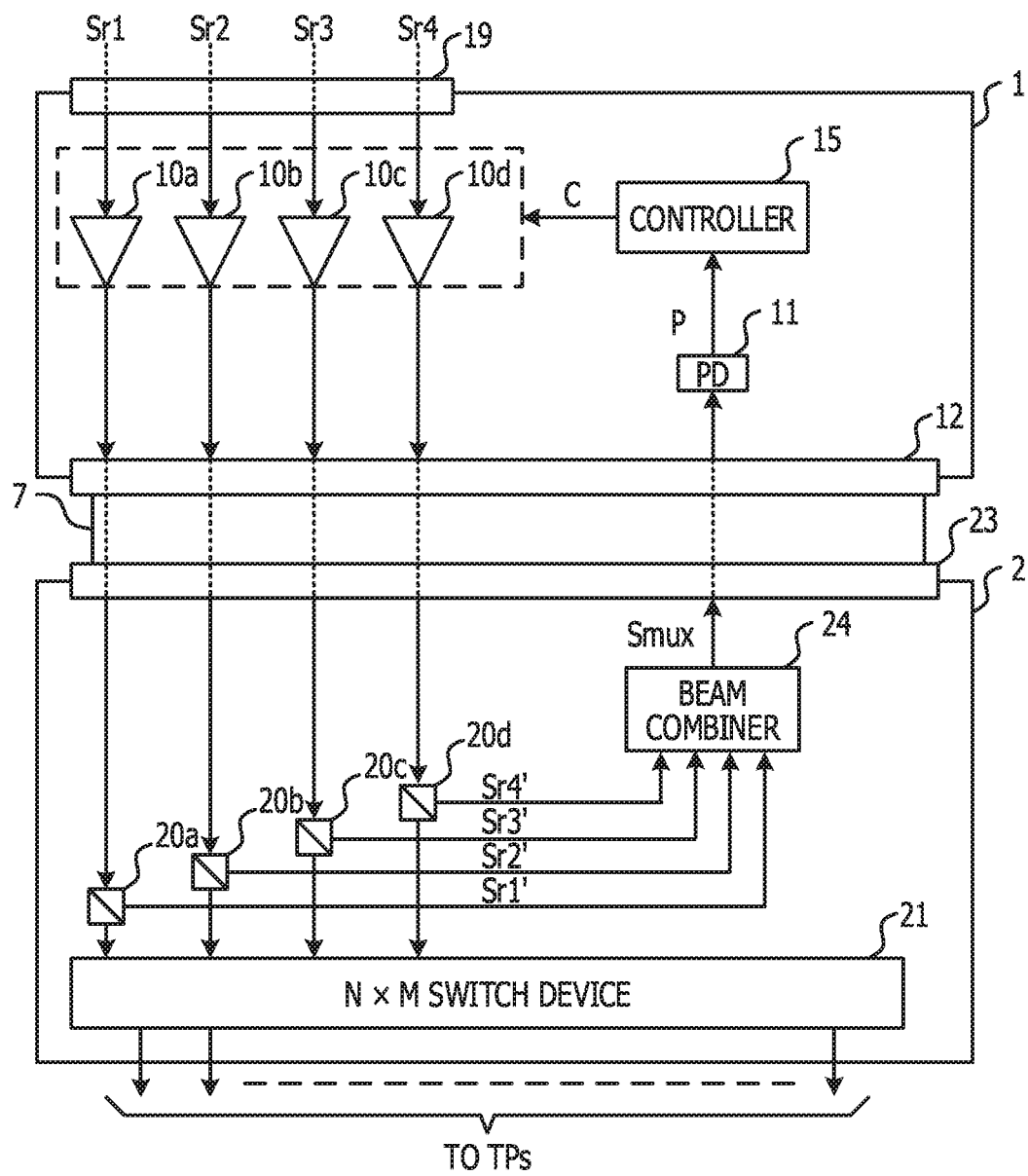
FIG. 4 illustrates configurations of an amplifier array device and an MCS device according to a second embodiment.

FIG. 4 illustrates configurations of the amplifier array device 1 and the MCS device 2 according to a second embodiment. Some components in FIG. 4 that are the same or substantially the same as those in FIG. 2 or 3 are denoted by the same reference numerals and description thereof is omitted.

The amplifier array device 1 includes the plurality of amplifiers 10a to 10d, the PD 11, the MPO connectors 12 and 19, and the controller 15. The MCS device 2 includes a plurality of beam separators 20a to 20d, the N×M switch device 21, the MPO connector 23, and a beam combiner 24. In this embodiment, N, which is the number of paths, is also assumed to be 4, for example.

The amplifiers 10a, 10b, 10c, and 10d output the multiplex optical signals Sr1, Sr2, Sr3, and Sr4, respectively, to the MCS device 2 through the MPO cable 7. The multiplex optical signals Sr1 to Sr4 output to the MCS device 2 are input to the N×M switch device 21.

The beam separators 20a, 20b, 20c, and 20d respectively separate the multiplex optical signals Sr1, Sr2, Sr3, and Sr4 input from the amplifier array device 1 through the MPO connector 12. The beam combiner 24 combines separated light beams Sr1', Sr2', Sr3', and Sr4' generated by the beam separators 20a, 20b, 20c, and 20d, respectively, and outputs the resulting combined light Smux to the amplifier array device 1 through the MPO cable 7.

The PD 11 detects the power of the combined light Smux input from the MCS device 2 through the MPO cable 7. If the connection of the MPO cable 7 is defective, the power of the combined light Smux is decreased after the combined light Smux has traveled through the MPO cable 7. Accordingly, defective connection is detected based on the power detected by the PD 11.

The PD 11 detects the power of the combined light Smux generated from the multiplex optical signals Sr1 to Sr4 in the above manner, and thus, it is sufficient to provide the single PD 11. Accordingly, the apparatus for checking the connection of the MPO cable 7 becomes a small-scale apparatus and has a lower cost and a smaller mounting area. Since the combined light Smux is not returned in this embodiment unlike in the first embodiment, the number of ports of each of the MPO connectors 12 and 23 used and the number of cores of the MPO cable 7 used are each smaller than those in the first embodiment by one.

The first and second embodiments have described exemplary configurations for checking the connection of the MPO cable 7 connecting the amplifier array device 1 and the MCS device 2 to each other. The same or substantially the same configuration may be applied to a configuration for checking the connection of an MPO cable or another optical cable connecting other units.

As described above, the optical transmission apparatus according to this embodiment includes the amplifier array device 1 and the MCS device 2 that are coupled to each other via the MPO cable 7. The amplifier array device 1 includes the plurality of amplifiers 10a to 10d and the PD 11. The MCS device 2 includes the plurality of beam separators 20a to 20d and the beam combiner 24.

The plurality of amplifiers 10a, 10b, 10c, and 10d respectively output the multiplex optical signals Sr1, Sr2, Sr3, and Sr4 to the MCS device 2 through the MPO cable 7. The beam separators 20a, 20b, 20c, and 20d separate the multiplex optical signals Sr1, Sr2, Sr3, and Sr4, respectively, input from the amplifier array device 1 through the MPO cable 7. The beam combiner 24 combines the light beams Sr'1 to Sr'4 generated by the beam separators 20a to 20d and outputs the resulting combined light Smux to the amplifier array device 1 through the MPO cable 7. The PD 11 detects the power of the combined light Smux input from the MCS device 2 through the MPO cable 7.

With the above configuration, the PD 11 detects the power of the multiplex light Smux generated from the multiplex optical signals Sr1 to Sr4, and thus, it is sufficient to provide the single PD 11. Accordingly, the apparatus for checking the connection of the MPO cable 7 becomes a small-scale apparatus and has a lower cost and a smaller mounting area.

Therefore, the optical transmission apparatus according to this embodiment enables checking of the connection of the optical cable with a small-scale configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
   an amplifier array device; and
   a switch device coupled to the amplifier array device via an optical cable,
   wherein the amplifier array device includes:
   a plurality of amplifiers configured to amplify a plurality of optical signals at mutually different wavelengths and to output the plurality of amplified optical signals,
   a plurality of beam separators configured to generate a plurality of separated light beams by separating the plurality of amplified optical signals and to output the plurality of separated light beams,
   a beam combiner configured to generate combined light by combining the plurality of separated light beams and to output the combined light to the switch device through the optical cable,
   a photo-detector configured to detect a power of the combined light returned from the switch device through the optical cable, and
   a processor configured to determine whether defective connection of the optical cable occurs between the amplifier array device and the switch device, based on the power of the combined light,
   wherein the processor is configured to cause a power of the plurality of amplified optical signals, output from the plurality of amplifiers, to be decreased when the power of the combined light detected by the photo-detector falls below a predetermined value.

2. The optical transmission apparatus according to claim 1,
   wherein the switch device includes a waveguide configured to return and output, to the amplifier array device through the optical cable, the combined light input from the amplifier array device through the optical cable.

3. The optical transmission apparatus according to claim 1,
wherein the switch device includes optical switches configured to receive, through the optical cable, the plurality of amplified optical signals output from the plurality of beam separators and to output each of the amplified optical signals to a corresponding one of different transponders.

4. An optical transmission apparatus, comprising:
an amplifier array device; and
a switch device coupled to the amplifier array device via an optical cable,
wherein the amplifier array device includes:
　a plurality of amplifiers configured to amplify a plurality of optical signals at mutually different wavelengths and to output the plurality of amplified optical signals,
　a photo-detector configured to detect a power of combined light input from the switch device through the optical cable, and
　a processor configured to determine whether defective connection of the optical cable occurs between the amplifier array device and the switch device, based on the power of the combined light,
wherein the switch device includes:
　a plurality of beam separators configured to generate a plurality of separated light beams by separating the plurality of amplified optical signals and to output the plurality of separated light beams, and
　a beam combiner configured to generate the combined light by combining the plurality of separated light beams and to output the combined light to the amplifier array device through the optical cable, and
wherein the processor is configured to cause a power of the plurality of amplified optical signals, output from the plurality of amplifiers, to be decreased when the power of the combined light detected by the photo-detector falls below a predetermined value.

5. The optical transmission apparatus according to claim 4, wherein the switch device includes optical switches configured to receive, through the optical cable, the plurality of amplified optical signals output from the plurality of beam separators and to output each of the amplified optical signals to a corresponding one of different transponders.

6. An optical signal processing method performed by an optical transmission apparatus including an amplifier array device and a switch device coupled to the amplifier array device via an optical cable, the optical signal processing method comprising:

amplifying, by the amplifier array device, a plurality of optical signals at mutually different wavelengths and outputting the plurality of amplified optical signals;

separating, by the amplifier array device, the plurality of amplified optical signals to generate a plurality of separated light beams and outputting the plurality of generated separated light beams;

combining, by the amplifier array device, the plurality of generated separated light beams to generate combined light and outputting the generated combined light to the switch device through the optical cable;

detecting, by the amplifier array device, a power of the generated combined light returned from the switch device through the optical cable;

determining, by the amplifier array device, whether defective connection of the optical cable occurs between the amplifier array device and the switch device, based on the power of the combined light; and causing a power of the plurality of amplified optical signals, output from the plurality of amplifiers, to be decreased when the power of the combined light falls below a predetermined value.

* * * * *